US00RE38259E

(19) United States
(12) Reissued Patent
Kuchar et al.

(10) Patent Number: US RE38,259 E
(45) Date of Reissued Patent: Oct. 7, 2003

(54) RADIUS LIGHTING TRACK SYSTEM

(75) Inventors: James Kuchar, Fall River, MA (US); Anthony Donato, Wellesley, MA (US)

(73) Assignee: Genlyte Thomas Group LLC, Louisville, KY (US)

(21) Appl. No.: 29/104,112

(22) Filed: Apr. 26, 1999

Related U.S. Patent Documents

Reissue of:

(64) Patent No.: Des. 402,964
Issued: Dec. 22, 1998
Appl. No.: 29/052,910
Filed: Apr. 8, 1996

(51) LOC (6) Cl. ..... 13-03
(52) U.S. Cl. ..... D13/155; D26/113; D26/140
(58) Field of Search ..... D26/60–66, 113, D26/140, 155; 362/269, 275, 287, 418, 419, 427; 439/110–122; D13/155

(56) References Cited

U.S. PATENT DOCUMENTS

| | | | | | |
|---|---|---|---|---|---|
| 2,441,461 | A | * | 5/1948 | Wayne | 439/115 |
| 2,617,849 | A | * | 11/1952 | Wright et al. | 439/120 |
| 4,814,849 | A | * | 3/1989 | Distasio | 362/147 |
| 5,154,509 | A | * | 10/1992 | Wulfman et al. | 362/147 |
| D355,164 | S | * | 2/1995 | Shen | D13/155 |
| D358,803 | S | * | 5/1995 | Shen | D26/155 |

OTHER PUBLICATIONS

TLS Oval, Progressive Architecture, 4, 1985.*
Targetti dicro, Abitare, Mar. –1987, 1987.*
Alta Lite, sistema Batrack, 1981.*
Altalite, Targetti Sankey, 12, Dec. –1982.*
Armetide, Progressive Architecture, Mar. –1985.*

* cited by examiner

*Primary Examiner*—Jennifer Rivard
(74) *Attorney, Agent, or Firm*—Middleton Reutlinger

(57) CLAIM

The ornamental design for a lighting fixture track system, as shown and described.

DESCRIPTION

FIG. 1 is a front perspective view of the lighting fixture track system;
FIG. 2 is a rear perspective view of the lighting fixture track system;
FIG. 3 is a first side elevational view of the lighting fixture track system;
FIG. 4 is a second side elevational view of the lighting fixture track system;
FIG. 5 is a third side elevational view of the lighting fixture track system;
FIG. 6 is a fourth side elevational view of the lighting fixture track system;
FIG. 7 is a plan view of the lighting fixture track system;
FIG. 8 is a perspective view of a second embodiment of the lighting fixture track system, the second embodiment differing from the first only by the omission of the square plate from the end of the track; and,
FIGS. 9–11 are enlarged, fragmentary perspective views of portions of the track common to both embodiments, the track being fragmentarily shown for convenience of illustration.
The track is broken away in FIGS. 1 through 9 to indicate indeterminate length. The track light is shown in broken lines for illustrative purposes only and forms no part of the claimed design.

1 Claim, 7 Drawing Sheets

Figure 3:
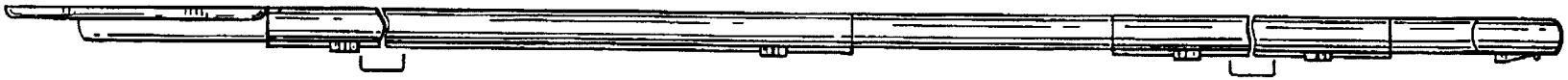
Figure 4:
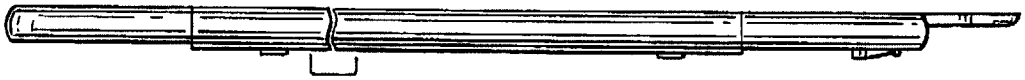
Figure 5:
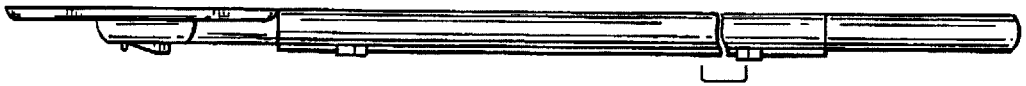
Figure 6:
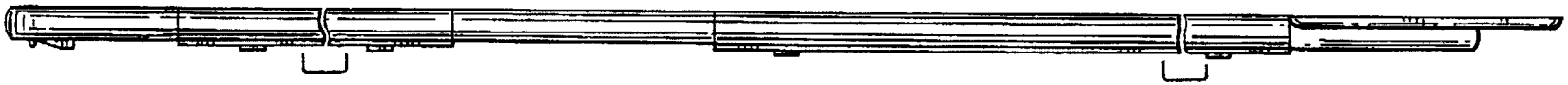
Figure 7:
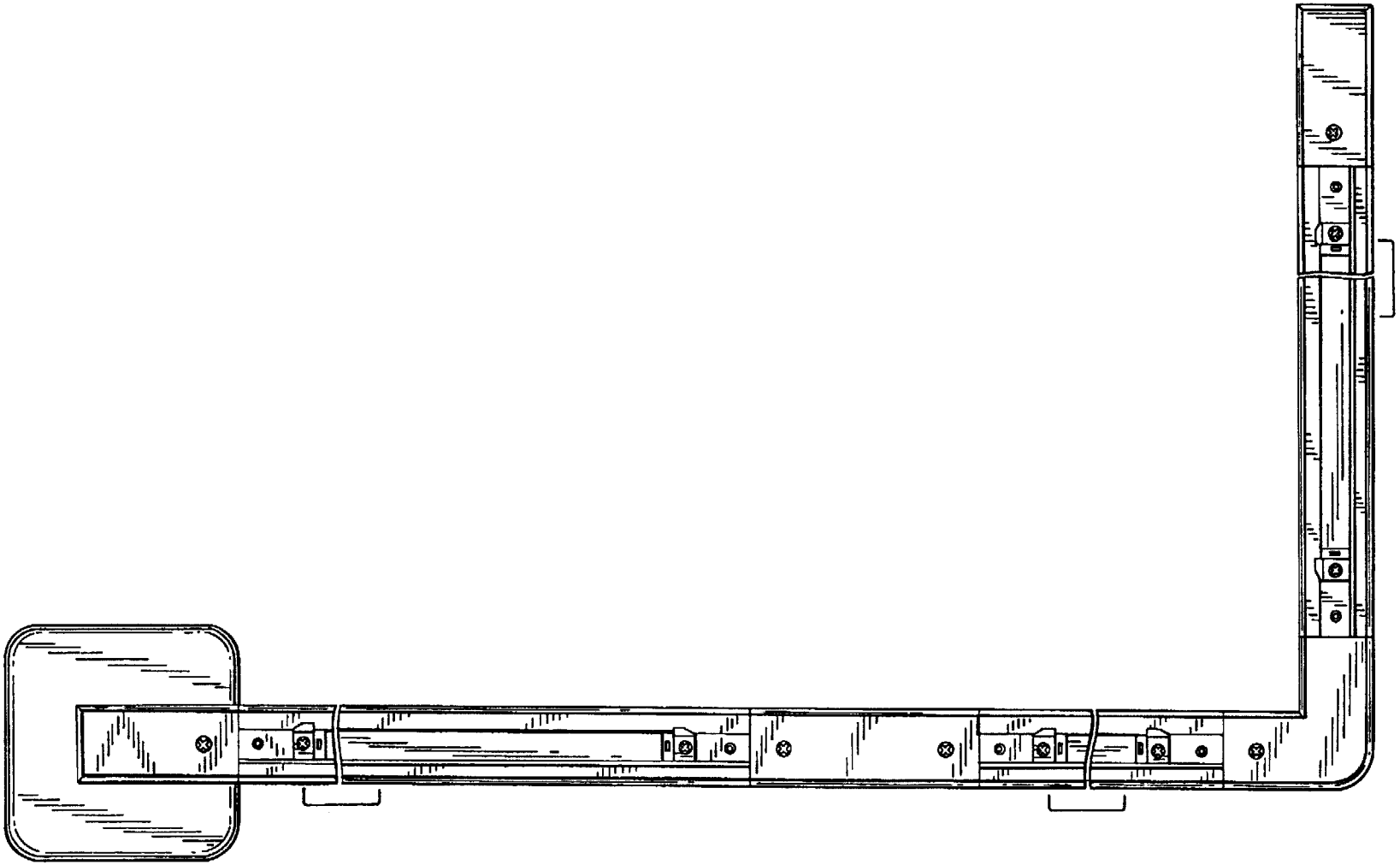
Figure 9:
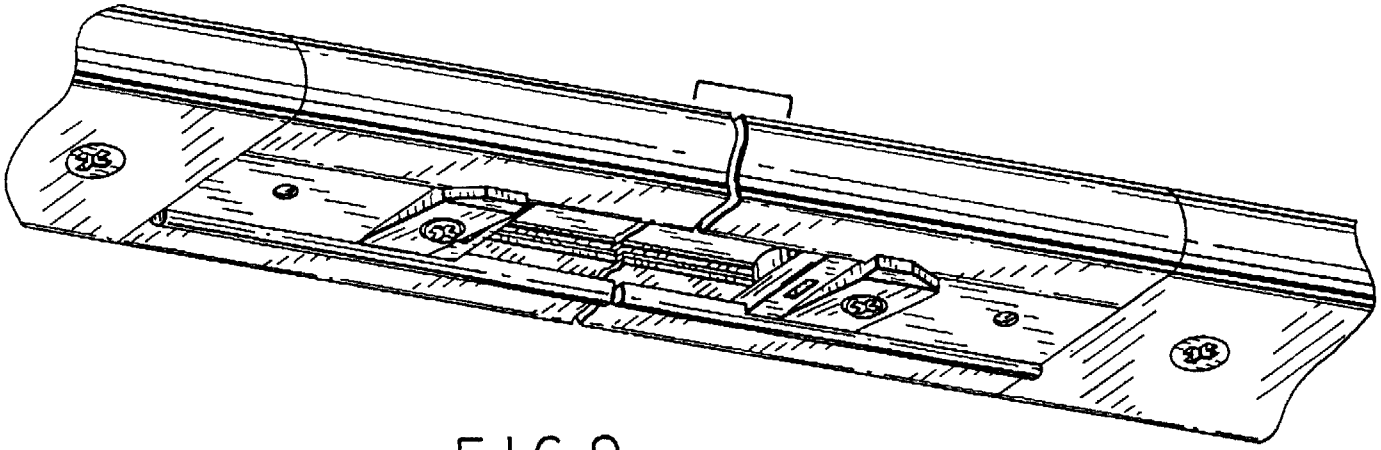
Figure 10:
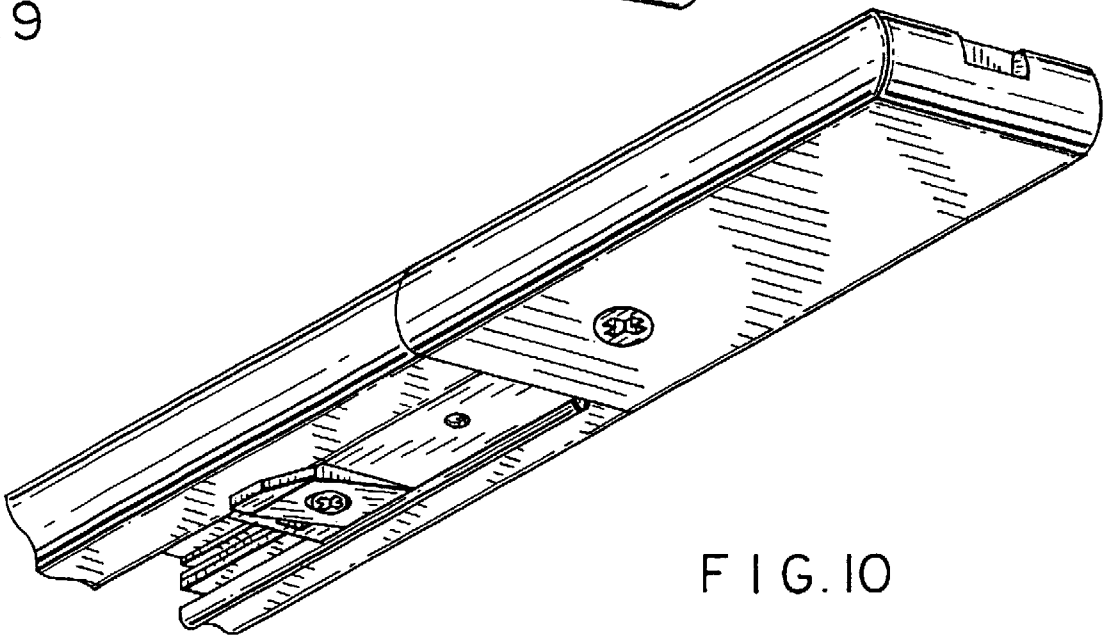
Figure 11:
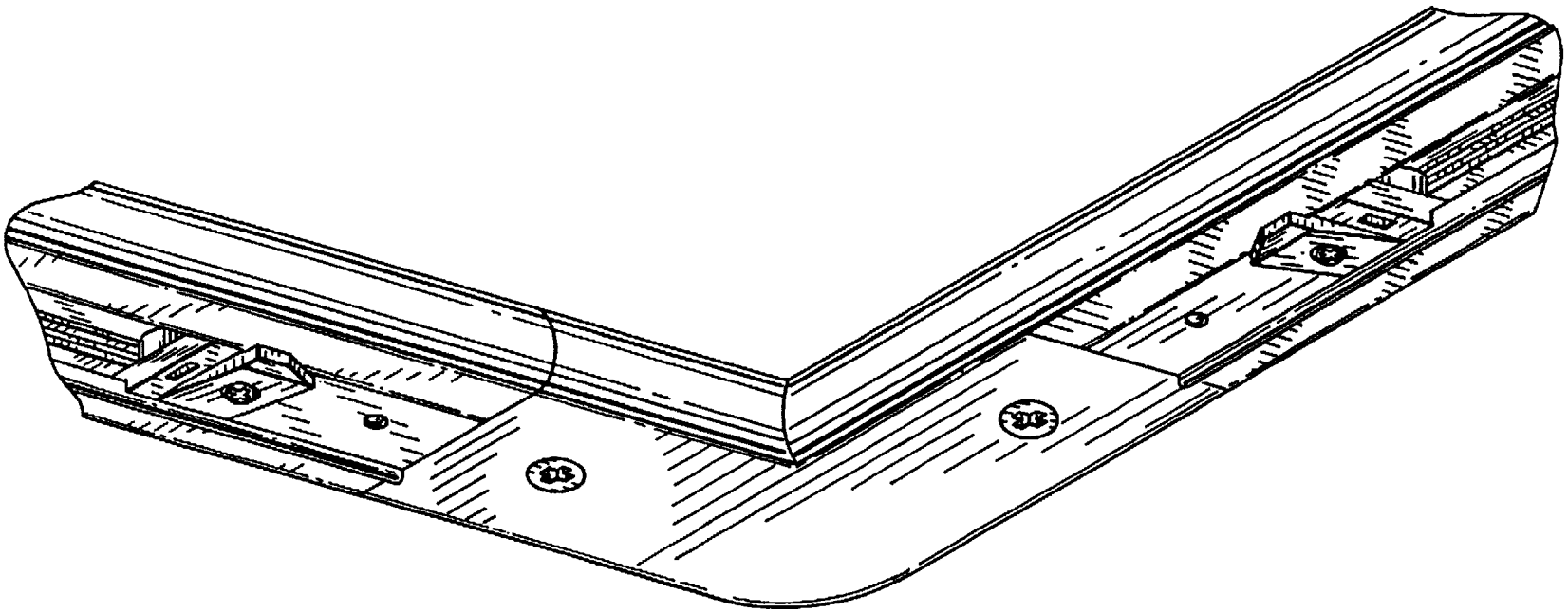

Matter enclosed in heavy brackets [ ] appears in the original patent, but forms no part of this reissue; matter printed in italics indicates the additions made by reissue.

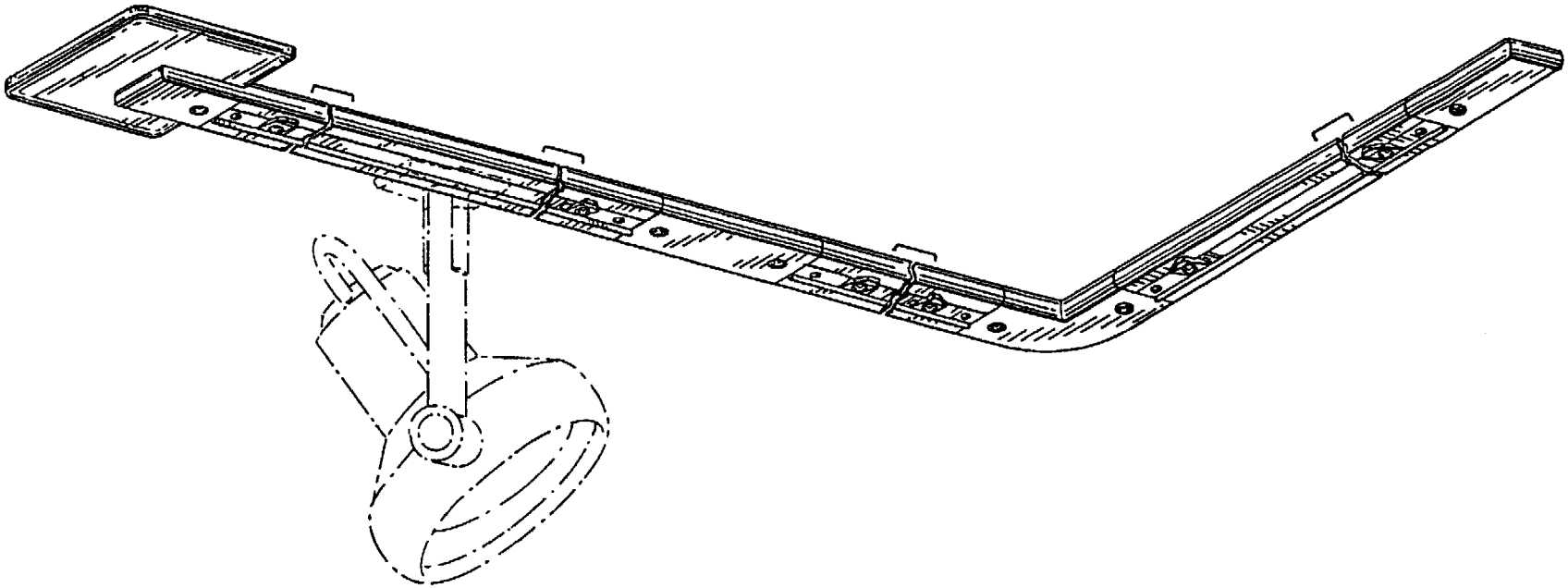
FIG. 1
AMENDED

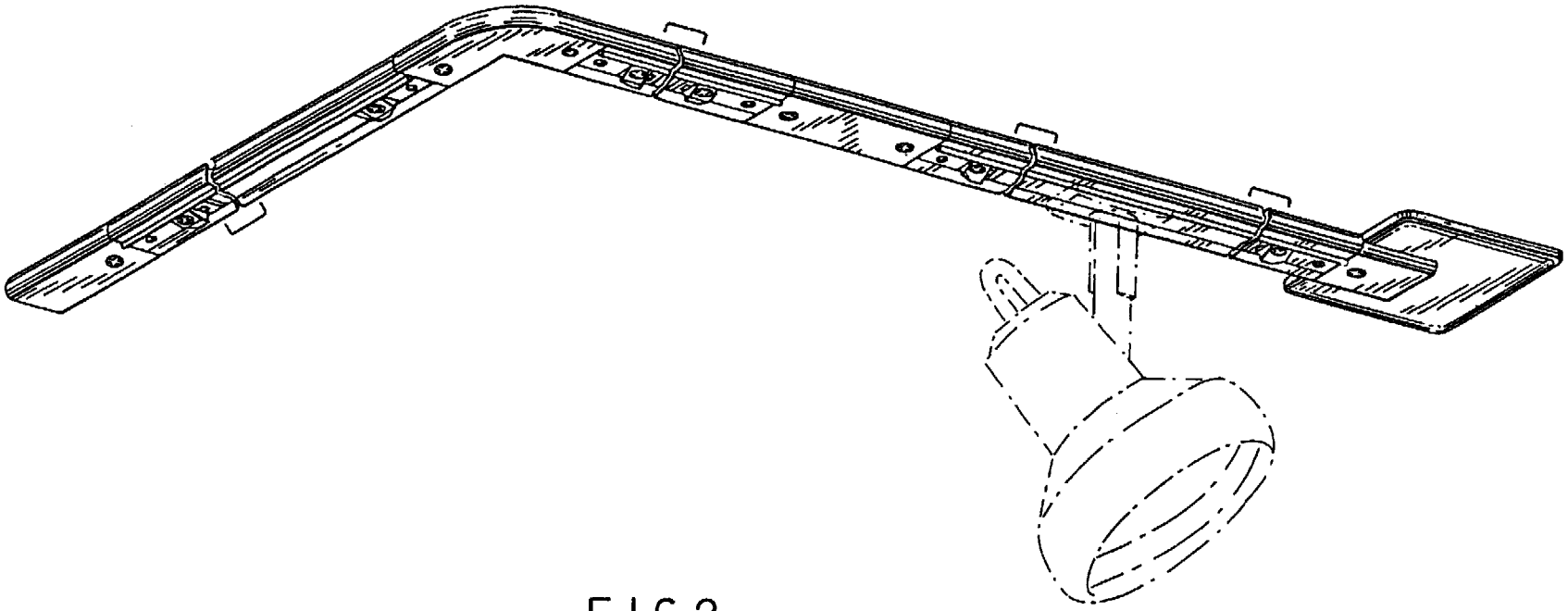
FIG.2
AMENDED

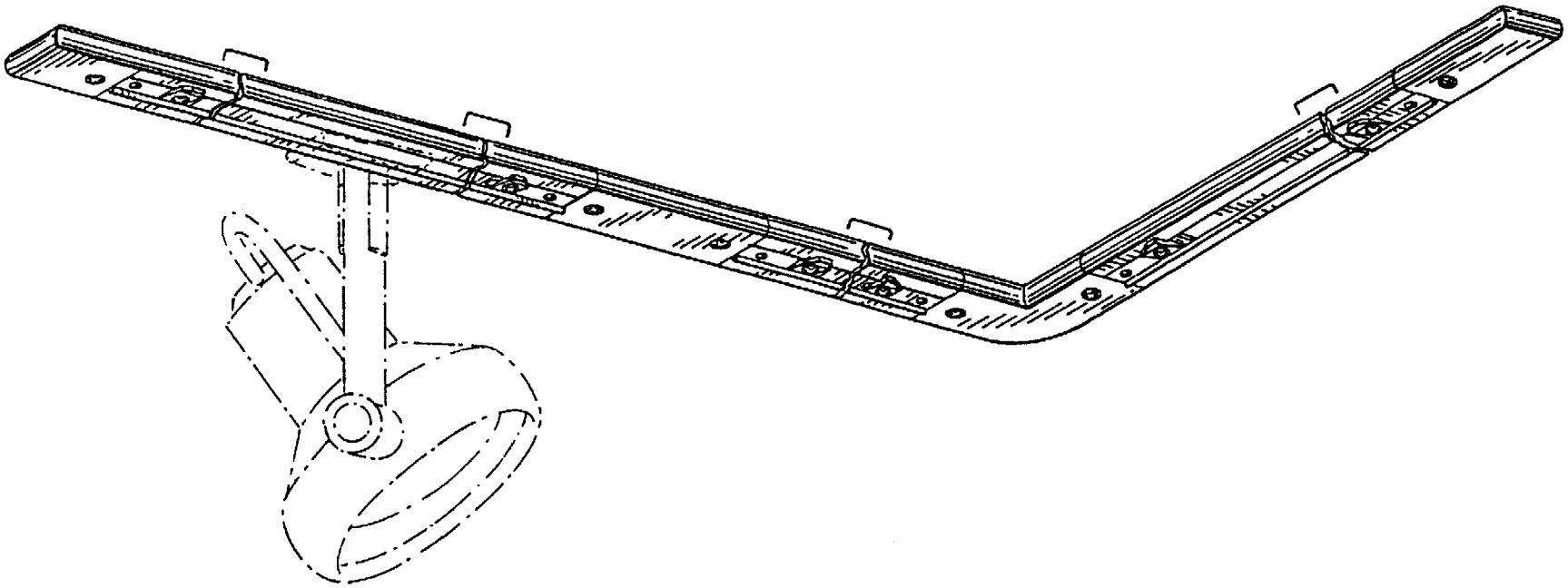
FIG. 8
AMENDED